June 30, 1931.  E. L. SMALLEY  1,811,979
FURNACE OR HEAT TREATMENT CHAMBER COOLING MEANS
Filed Feb. 9, 1928  6 Sheets-Sheet 2

INVENTOR.
Edwin L. Smalley,
BY John B. Brady
ATTORNEY.

June 30, 1931.  E. L. SMALLEY  1,811,979
FURNACE OR HEAT TREATMENT CHAMBER COOLING MEANS
Filed Feb. 9, 1928   6 Sheets-Sheet 4

Patented June 30, 1931

1,811,979

UNITED STATES PATENT OFFICE

EDWIN L. SMALLEY, OF WHITEFISH BAY, WISCONSIN, ASSIGNOR TO HEVI DUTY ELECTRIC COMPANY, OF MILWAUKEE, WISCONSIN, A CORPORATION OF WISCONSIN

FURNACE OR HEAT TREATMENT CHAMBER COOLING MEANS

Application filed February 9, 1928. Serial No. 253,199.

My invention relates broadly to furnaces or heat treatment chambers and more particularly to a method of cooling furnaces or heat treatment chambers and the material therein without subjecting the material within the furnace to the oxidizing action of free air.

One of the objects of my invention is to provide a construction of cooling system for furnaces or heat treatment chambers by which material deposited within the furnace for cooling may be subjected to a predetermined temperature gradient over a predetermined time period.

Another object of my invention is to provide a method of cooling a charge within a furnace or chamber without the admission of free air to the furnace or chamber, reducing the amount of oxidization, with means for controlling the rate of such cooling.

Still another object of my invention is to provide a system of cooling heat treatment furnaces or chambers by conduction and convection heat currents around the charge within the heat treatment furnace or chamber without subjecting the charge to contact with free air.

A further object of my invention is to provide a construction of heat treatment furnace or cooling chamber wherein heat within the chamber of the furnace may be removed at a predetermined rate for cooling the charge within the furnace by means of a plurality of flues located around the charge within the furnace for conveying cooling air around the charge but out of contact therewith for absorbing heat from the charge at a predetermined rate.

A still further object of my invention is to provide a construction of furnace or cooling chamber wherein the rate of cooling may be controlled by a reduction in the amount of heat insulation around the furnace at predetermined times for controlling the cooling of the charge at a selected rate while preventing the oxidizing action which would result from the contact of free air with the charge within the furnace.

Other and further objects of my invention reside in the arrangement of control apparatus for cooling means in heat treatment furnaces or chambers and the selective operation thereof for effecting the cooling of a charge along a predetermined temperature gradient over a definite time period.

My invention will be more fully understood from the specification hereinafter following by reference to the accompanying drawings in which:

Fig. 3 is a lateral cross-sectional view through a modified furnace structure employing the principles of my invention; Fig. 9 is a fragmentary view of the operating structure forming the cooling means for the furnace and heat treatment chamber illustrated in Fig. 7; Fig. 10 is a schematic wiring diagram showing the mechanical and electrical equipment for automatically controlling the heat and cooling-time-temperature cycle wherein the cooling system provides forced air circulation.

My invention is directed to a method of cooling furnaces or heat treatment chambers without the admission of free air to a furnace chamber or to a cooling chamber, either by manual operation or control of the cooling means, or automatically controlled means. By my invention when either a furnace or a cooling chamber is controlled automatically, it may be accomplished at a predetermined time-temperature-cycle. The actual invention consists of providing a cooling means which is mechanically and electrically interlocked with a heating means, whereby the cooling may be either retarded or accelerated either manually or automatically controlled.

In numerous manufacturing processes at the present time, such as in the heat treatment of certain kinds of rolled alloy steels or alloy castings; or in the manufacture of glassware and pottery, or other ceramic processes; or in the manufacture of malleable iron, it is extremely desirable to control the time of heating to a predetermined temperature, holding that temperature until the work is thoroughly saturated and the change of structure in the work effected, and then subsequently to cool at a predetermined rate, or especially to accelerate the cooling without detriment to the work in process, and thus save considerable manufacturing time.

The time of cooling depends on the total absorbed heat in the charge of a furnace or cooling chamber, and the radiation from the furnace walls. In a given furnace, a light weight charge will cool faster than a heavy weight charge, and this provides a means of cooling in a given time at a predetermined rate, regardless of the weight of charge in the furnace.

Heretofore cooling has been effected by the introduction of free air into the furnace or cooling chamber, but this is highly undesirable, particularly in steel treatment, as it produces excessive oxidization.

Heretofore it has been proposed to subject a selected charge to heat and then permit natural cooling thereof. It requires a considerable time period to effect such natural cooling. In one case heretofore investigated to cool a six ton charge of miscellaneous steel castings by natural dissipation of the heat of the charge through the furnace walls, without admission of free air to the furnace chamber, required thirty-six hours. After the installation of the flues and cooling methods set forth herein, the same weight of charge was cooled without the admission of free air in 22½ hours. The complete cycle consists of starting with the furnace comparatively cool, as at a temperature residue after the previous day's run, bringing the charge up to an annealing temperature of 1600 to 1650° F., holding the furnace and charge until the charge is thoroughly and uniformly saturated at one of those temperatures, and then cooling as rapidly as possible to a temperature below a visible heat, which is about 850° F. Below that temperature, castings may be subjected to free air circulation without excessive oxidization and without setting up strains in the castings that would be inherent if cooled too rapidly.

The necessity for a cooling chamber in combination with a furnace chamber may be shown by the fact that the furnace chamber, having a car in which there are heating elements on the car top in accordance with E. L. Smalley's Patent No. 1,547,623, dated July 28, 1925 for electrical furnaces, can heat a given weight of charge or mass density at the rate of three heats per day compared to furnaces without car top heat requiring 12 hours. In order to effect economic operation of the furnace the cooling period is advanced by the system herein described to render the furnace available to take a new charge within a reasonable time period.

Referring to the drawings in more detail, reference character 1 designates a supporting surface upon which foundation walls 2 are mounted and a rail system as represented at 3 over which the car 4 operates. The car 4 carries the material, represented in dotted lines 6, which is to be subjected to heat treatment. The car bottom may be heated by means of heaters 5 as illustrated, embedded in the car 4 for imparting required heat to the material 6. The space within the heating chamber of the furnace has been designated at 8. A refractory lining 9 is provided for the furnace and suitable heating coils designated at 50 may be positioned on the interior of the refractory lining for the furnace. An exterior covering of heat insulation represented at 10 is provided around the refractory brick lining 9. Suitable heat sealing plates 51 and 52 may be disposed upon the surface structure and upon the car 4 for preventing leakage of heat from the interior of the furnace and preventing the admission of free air to the charge within the furnace. The space between plates 51 and 52 may be filled with any suitable sealing material, such as sand, for preventing leakage of air to the interior of the chamber.

Figure 1:
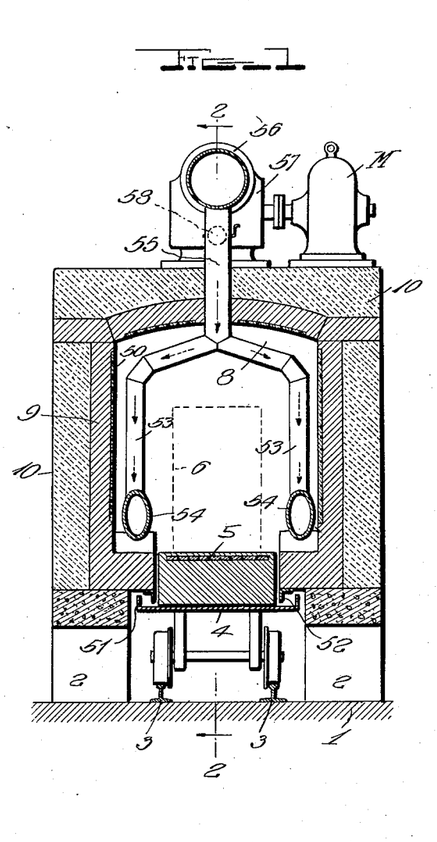
Figure 1 is a lateral cross-sectional view taken through the furnace structure of my invention illustrating one arrangement of cooling flues therein.

In Figure 1, I have shown flues in the form of pipes 53 which extend vertically along the side walls of the furnace and connect with horizontally extending manifolds 54 at each side of the furnace. The vertically extending flues 53 are connected by risers 55 with an upper horizontally extending manifold 56 which extends from a fan blower 57 driven by motor M. The discharge of the air which is supplied from manifold 56 through risers 55 and flues 53 is exhausted at 59. Valve dampers 58 are positioned in the risers 55 and provide means for regulating the passage of cooling air through the flues 55.

Figure 4:
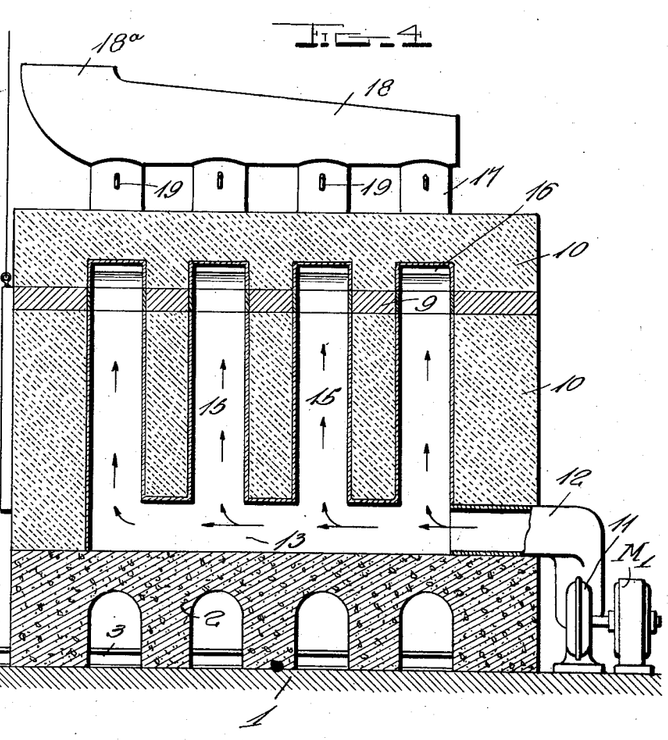
Fig. 4 is a longitudinal cross-sectional view taken on line 4—4 through the furnace structure of Fig. 3.

In lieu of the flues positioned interiorly of the furnace I may provide flues within the walls of the furnace structure, as shown in Figs. 3 and 4. In this arrangement flues 15 are positioned vertically in the walls of the furnace structure projected from horizontally extending flues 13 and 14 and connecting laterally extending flues 16 in the top of the furnace structure. The laterally extending flues 16 terminates at risers 17, which in turn connect with manifold 18 having exit port at 18a. Horizontally extending manifolds 13 and 14 are supplied with air through pipe 12 from blower 11 which is driven by motor $M_1$.

In order to regulate the passage of air through the flues 13, 14, 15, 16 and 17, I provide valve dampers 19 in each of the flues for controlling to a desired degree the volume of cooling air passing through the flues for any given time period.

Figure 5:
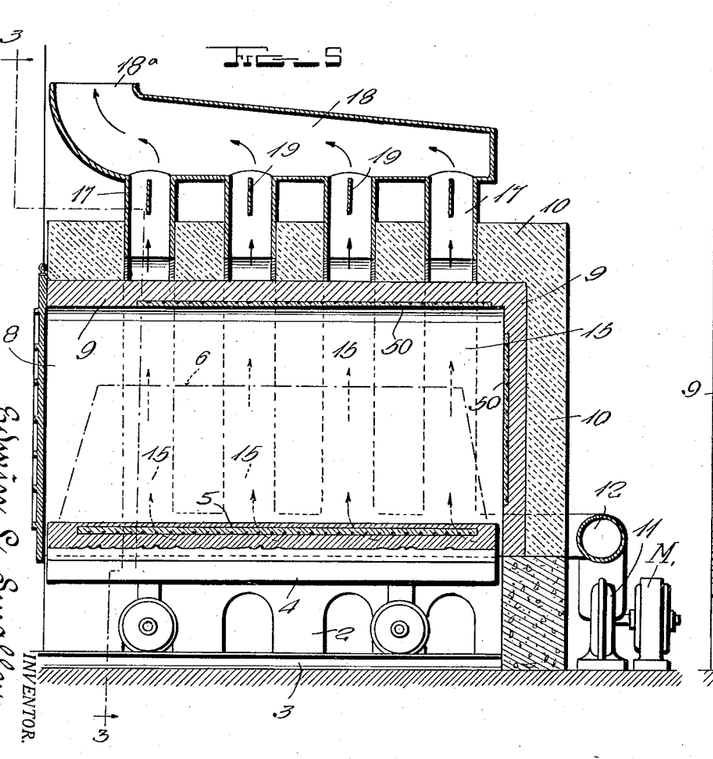
Fig. 5 is a longitudinal cross-sectional view taken on line 5—5 of Fig. 3.

In Fig. 5 I have shown more clearly the arrangement of the vertical risers 17 with respect to the manifold 18 in the furnace structure.

Figure 6:
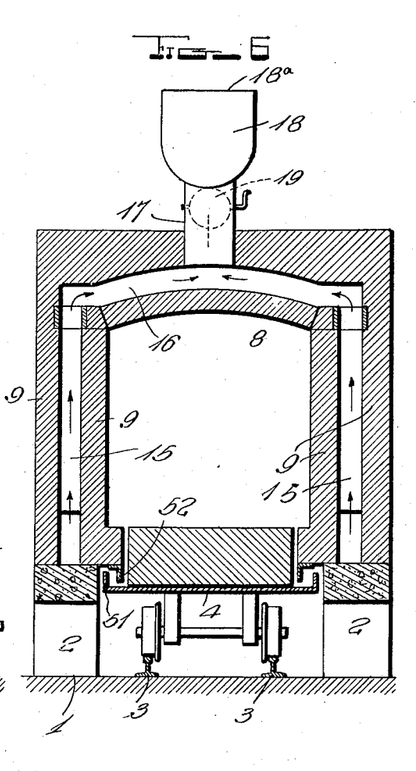
Fig. 6 is a lateral cross-sectional view through a cooling chamber having built-in flues constructed in accordance with my invention.

In Fig. 6 I have shown the application of my invention to a cooling chamber which is independent of the furnace chamber. In this structure it will be observed that the heat insulation exterior covering has been omitted from the cooling chamber system. The vertical flues 15 pass through the fire brick lining 9 joining the laterally extending flue 16 at the top of the cooling chamber, which in turn extends to the risers 17. There is no heat insulation covering on the cooling chamber nor are there any heaters on the interior walls of the cooling chamber.

Figures 7, 8:
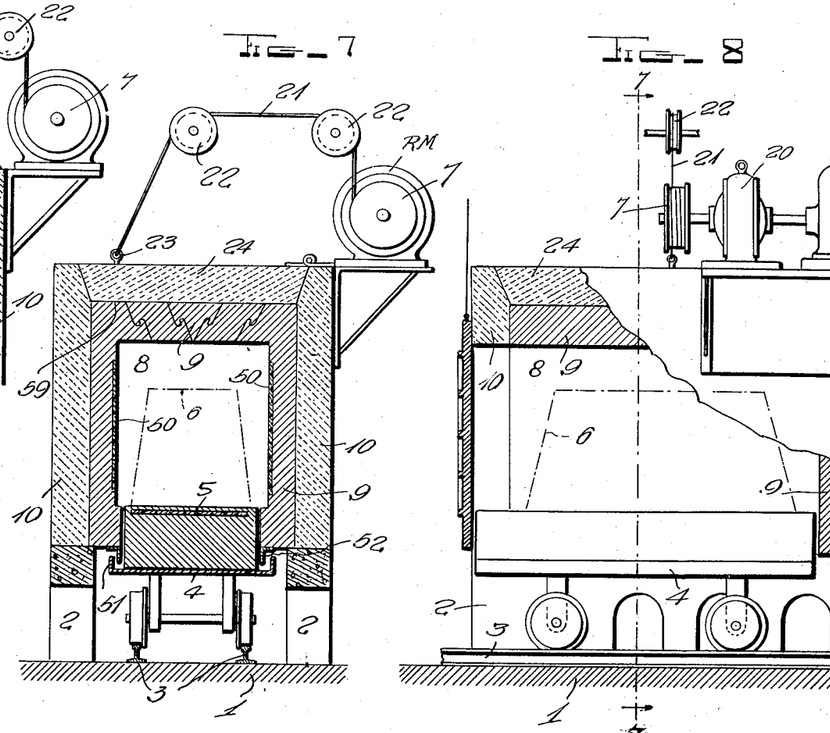
Fig. 7 is a cross-sectional view through a modified form of furnace and cooling chamber embodying the principles of my invention.
Fig. 8 is a side elevation of the furnace shown in Fig. 7 partially broken away and illustrated in cross-section.
Figure 7:
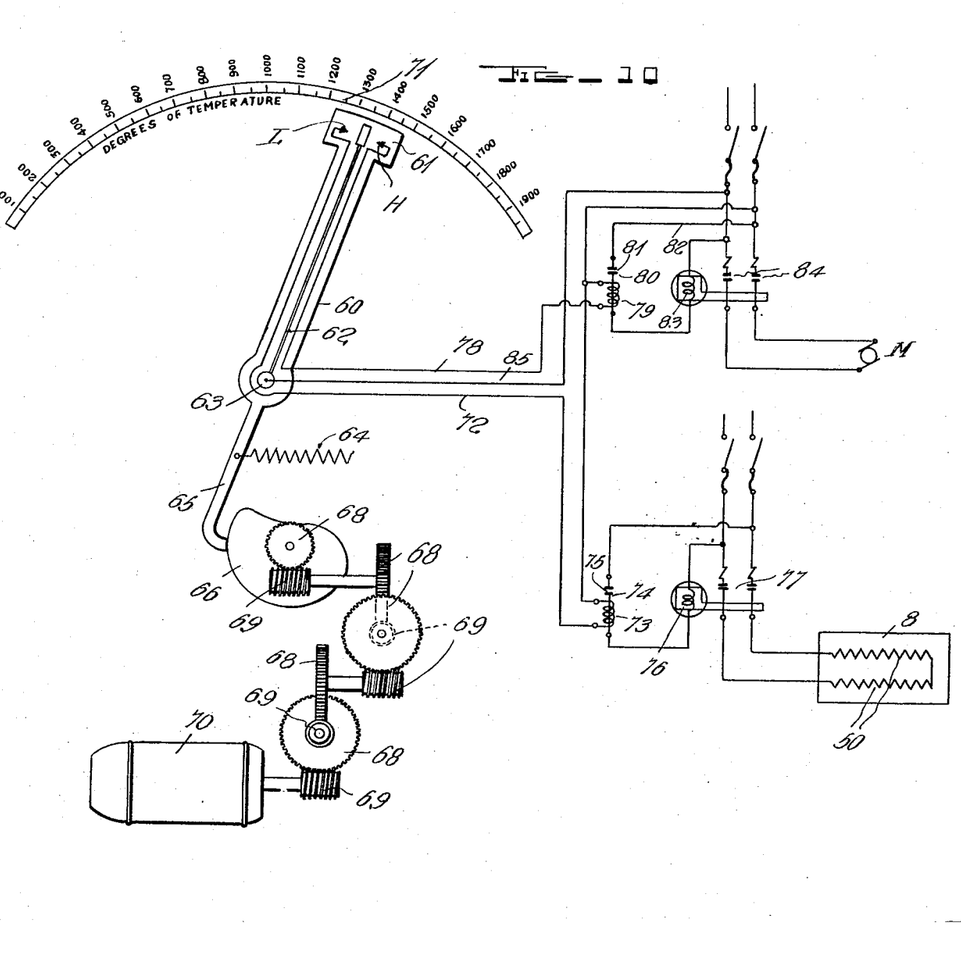

In Figs. 7, 8 and 9 RM represents a reversible motor directly connected to worm gear speed reducer 20, attached to cable drum 7. Cable 21 runs over sheaves 22, where it is attached to cover 8 as by screw eye 23. Motor RM, through mechanism as shown, controlled as in diagram Fig. 11, can raise cover 24 to its uppermost position shown in Fig. 9 from the normal position in pit 59 shown in Figs. 7 and 8, and can then lower it to closed position adjacent the heat insulation covering in successive cycles as required. This arrangement does not permit of free air access to the furnace chamber, but cooling is accelerated by removing the insulation from the arch, causing rapid radiation from the conducted heat through the furnace arch. I do not, however, intend my invention to be limited to a hinged cover above the arch, as I may hinge the panels on the side walls as effectively as above the arch.

Motors M, $M_1$ and RM can be operated manually by the opening and closing of a service switch. Cable drum 7 of Figs. 7, 8 and 9 may be operated manually by using a winch with a crank for hand operation, affording a means of raising the lowering cover 24 of Figs. 7, 8 and 9 at will.

Figure 11:
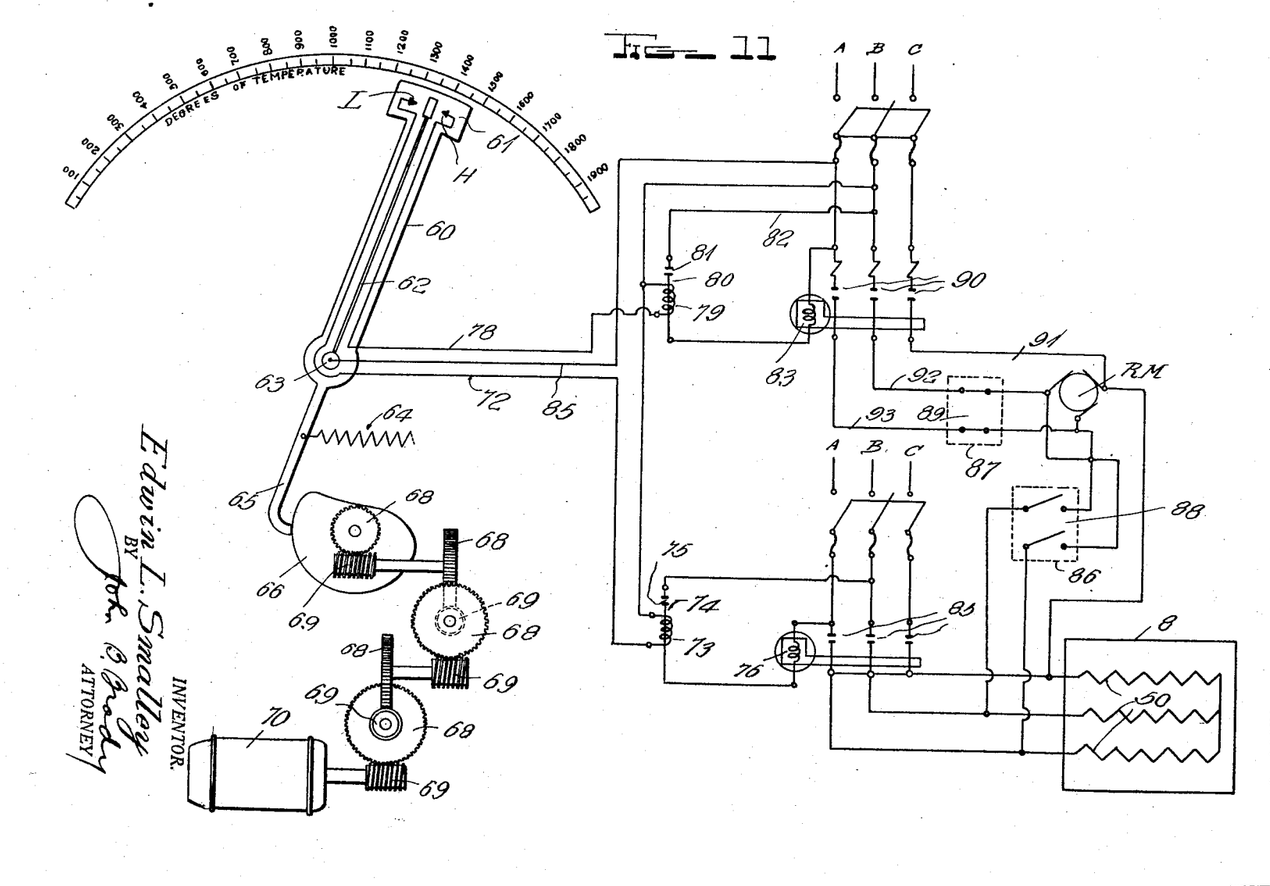
Fig. 11 is a schematic wiring diagram showing the arrangement of equipment for controlling the cooling cycle by removal of the insulation from the walls of the furnace as illustrated in Figs. 7, 8 and 9.

As a means of automatically accomplishing a predetermined rate of heating, soaking and cooling, I show diagrammatically in Figs. 10 and 11, wiring diagrams of an electrically operated control system.

In Fig. 10, 60 is a movable arm of a program controller, carrying a contact table 61, with electrical contact L and electrical contact H. 62 is the customary form of pyrometer needle of said program controlled or time-temperature-cycle controller, actuated by thermocouple located in the furnace chamber or in a cooling chamber (couple not shown). This movable pyrometer needle 62 is rotatable about a common center 63, which is concentric with the center about which movable arm 60 is rotatable. 64 is a helical spring in tension, keeping lever arm 65 in constant contact with the perimeter of cam 66. Cam 66 can be made to make any required number of revolutions in any required time, as by means of a train of worm wheels and worms 68 and 69, respectively, driven by means of motor 70.

The contour of cam 66 can be made of any shape that is required to move the contact arm 60 across scale 71, and hold arm 60 at any position on scale 71, and to reverse the movement of arm 60 backward to the starting point, and cause any action in a predetermined time cycle.

The train of worm wheels and worms is drawn to scale. If motor 70 revolves at the rate of 1800 revolutions per minute, cam 66 with the train as shown would revolve .972 revolutions per week, or less than four per month.

When the temperature in furnace 8, shown heated by electric heating coils 50, is below the required temperature, the thermocouple actuated needle 62 will be deflected until it makes contact with L, thereby setting up a circuit through line 72 through the coil 73 of a relay switch 74 and thereby closing contact 75. Closing of contact 75 energizes coil 76 of main line contactor and closes contacts 77, thereby applying energy to coils 50 of furnace 8. The rising temperature of furnace causes thermocouple in furnace to become heated to a higher temperature and thus needle 62 of instrument is swayed away from contact L toward contact H, but not in contact with either, and thus opens circuit through line 72, de-energizing coils 73 and 76, and thereby opening main contacts 77.

When furnace temperature again lowers, a recurrence of the same cycle of contacts and the same results will be effected. If the temperature of the furnace is such as to cause needle 62 to poise between contacts L and H, and simultaneously cam 66 through lever 65 should cause arm 60 and contact table 61 to travel toward needle 62 for the purpose of increasing the temperature in the furnace, needle 62 will contact with L, and thereby set up a recurrence of the same circuits and results as above described.

Figure 2:
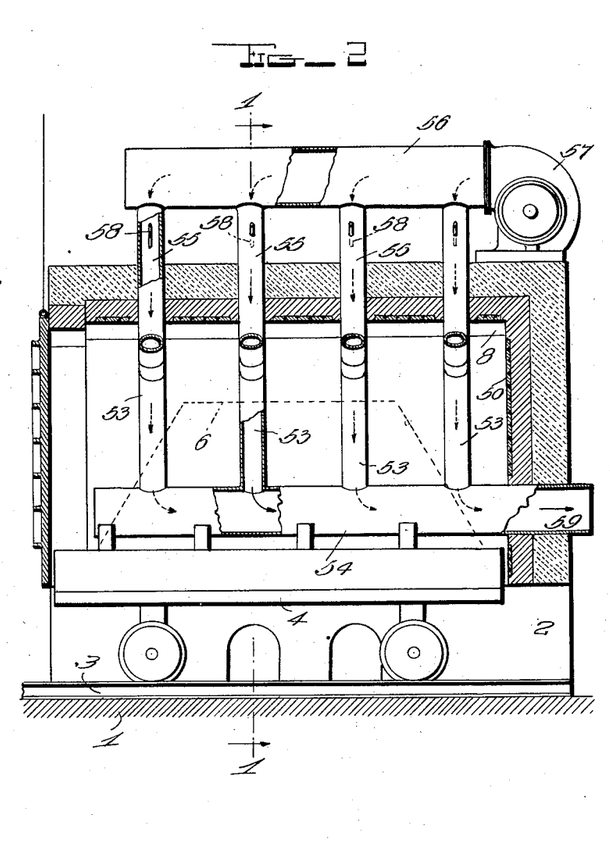
Fig. 2 is a longitudinal cross-sectional view through the furnace illustrated in Fig. 1 with the cooling flues shown partially in side elevation and partially in cross-section.

If the generation of heat by coils 50 of the furnace 8 is too great, the pyrometer needle 62 will be deflected to contact H, thereby setting up a current through line 78 and actuating coil 79 of relay 80, and closing relay contact 81. Line 82 thereby becomes energized, and by means of coil 83 of main contactor switches 84 closes the main contactor 84 and energizes motor circuits and causes the running of motor M. Motor M is connected to the fan blower. Starting the fan forces air circulation through the wall flues 15 of Figs. 3 and 4 or through the flues 53 of cooling chamber of Figs. 1 and 2. Circulation of air through such flues causes extraction of heat from the embedded flues of Figs. 3 and 4, or the incorporated flues of Figs. 1 and 2. When sufficient air has been blown through such flues as to cause a lowering of the temperature in a cooling chamber or in a furnace having flues in the wall of the furnace, the pyrometer needle 62 will be deflected downward away from H, thus opening the described line circuits and stopping motor M.

If, for any cause, the cooling chamber or furnace has not cooled at a rate equal to the travel effected through cam action 66 such cam action will cause arm 60 with contact table 61 to travel toward the low temperature end of scale and subsequently contact H will connect with needle 62, thereby setting up energized circuit, same as above described, and starting motor M, with the same results as above described.

If the above method of operation is applied to a cooling chamber to assist only in the acceleration of the cooling time, then relay 73 and contactor 77 and coils 50 in furnace 8 would be eliminated.

If a furnace such as 8 is heated by oil or gas, then by means of automatically controlled valves, operated by a solenoid such as 73, of which there are numerous styles available today, relay 73 and contactor 76 can operate the valves of furnace for controlling the flow of gas or oil to give the same effect as to temperature change as is afforded by coils 50 in the diagram.

Fig. 11 is applicable only to the operation of the hinged cover in Figs. 7, 8 and 9. Lines 78, 85 and 72 correspond to the same numbered lines of Fig. 10. When the temperature in chamber 8, shown heated by electric heating coils 50 is below the required temperature, the thermocouple actuated needle 62 will be deflected until it makes contact with L, thereby setting up a circuit through line 72, through the coils 73 of a relay switch 74, and thereby closing contact 75. Closing of contact 75 energizes coil 76 of main line contactor and closes contacts 85, thereby applying energy to coils 50 of furnace 8. The rising temperature of furnace causes thermocouple (not shown) in furnace to become heated to a higher temperature, and thus needle 62 of the instrument is swayed away from contact L toward contact H, but not in contact with either, and thus opens the circuit through line 72, de-energizing coils 73 and 76, and thereby opening the main contactors 85.

Limit switches 86 and 87 having contacts 88 and 89 are mechanically interlocked, and are opened and closed by the movement of cover 24 in Figs. 7, 8 and 9. When cover 24 is in its closed position as described, contacts 88 are open and contacts 89 are closed. When the cover 24 reaches its upper limit as shown in Fig. 9, the reverse condition exists and contacts 88 are closed and 89 are opened.

When the electrical lines A, B and C attached to coils 50 are closed and cover 24 is closed and contacts 88 are open, no energizing of motor RM exists, and therefore no action of cover 24 results.

When the furnace temperature again lowers, a recurrence of the same cycle of contacts and the same results will be effected. If the temperature of the furnace is such as to cause needle 62 to poise between contacts L and H and simultaneously cam 66 through lever 65 should cause arm 60 and contact table 61 to travel toward needle 62 for the purpose of increasing the temperature in the furnace, needle 62 will make contact with L, thereby setting up a recurrence of the same circuits and results as above described.

When the generation of heat in the furnace, as by coils 50 of furnace 8, is too great, pyrometer needle 62 will be deflected to contact H, thereby setting up a current through line 78 and actuating coil 79 of relay 80 by closing relay contact 81. Line 82 thereby becomes energized and by means of coil 83 of main contactor switches 90 closes the main contactor 90 and energizes motor circuits 91, 92 and 93 of reversible motor RM. Motor RM is mounted as in description of Fig. 8. Motor RM operates to raise cover 24 of Figs. 7, 8 and 9, and when said cover reaches its upper position 24 in Fig. 9 it trips limit switches 86 and 87 opening contacts 89 and closing contacts 88, thereby stopping motor.

When sufficient cooling of the furnace or cooling chamber has been effected by radiation from the thus exposed fire brick wall of furnace, needle 62 is deflected to contact L, and thus again energizing coils 73 and 76, and closing contactor 85. Contacts 88 of limit switch 86 have been left closed by the last previous operation, and contacts 89 of limit switch 87 have been left open. Therefore, simultaneously, with the energizing of heating coils 50, lines A, B and C energize motor RM, causing motor to run in opposite direction to its last operation, as polarity of motor connections is changed by the wired connections between limit switches 86 and 87, as shown in diagram, and thereby closes cover 24.

A recurrence of similar conditions repeats the same cycles of operation. If similar control of the cooling cycle in a cooling chamber is to be effected, furnace 8 should be considered as a cooling chamber, but it would have no heating coils 50. Otherwise, the same circuits would apply, provided the thermocouple not shown were considered as installed in the cooling chamber.

While I have disclosed systems of flues for performing the cooling operations in heat treatment systems, in some instances I may provide ports at selected positions in the heat treatment chamber. The entering port through which a circularizing cooling fluid may be injected may be at one port of the heat treatment chamber, and exit ports through which the heated cooling fluid is exhausted may be at a different port of the chamber. In Fig. 9 I may provide ports at the top of the chamber which may be automatically opened to permit free escape of heat by the automatic raising of cover 24.

The cooling system of my invention has been found to be extremely practical, and while I have described particular embodiments of my invention, I desire that it be understood that modifications may be readily made and that no limitations are intended upon my invention other than are imposed by the scope of the appended claims.

What I claim as new and desire to secure by Letters Patent of the United States is as follows:

1. In a heat treatment apparatus, a chamber, a plurality of flues extending vertically within said chamber and at opposite sides thereof, and horizontally extending manifolds interconnecting opposite ends of said flues for conveying a cooling mixture through said flues at a predetermined rate for controlling the temperature conditions existent within said chamber.

2. In a heat treatment apparatus, a chamber for material to be subjected to heat treatment, a plurality of flues positioned in lateral planes along the length of said chamber, manifolds interconnecting said flues at opposite ends thereof, and means for forcing a cooling mixture through said flues at a predetermined rate.

3. In a heat treatment apparatus, a chamber, a plurality of flues positioned adjacent the interior of said chamber, manifolds interconnecting the ends of said flues, and means for forcing a cooling mixture through said flues and manifolds at a predetermined rate for lowering the temperature of said chamber without the admission of free air thereto.

4. In a heat treatment apparatus for high temperature heat treatment work, a furnace chamber, electrical means for heating said chamber, a plurality of flues extending in vertical paths in fixed relation to said chamber, a horizontally extending flue interconnecting the ends of each of said plurality of flues and means for deenergizing said electrical means and passing a cooling fluid through each of said flues through a predetermined time cycle for controlling the temperature conditions existent within said furnace chamber without the admission of free air.

5. In a heat treatment apparatus for high temperature heat treatment work, the combination of a heat treatment chamber, electrical means for heating said chamber, horizontal flues adapted to conduct a cooling fluid adjacent inner walls of said chamber and a multiplicity of vertical flues connected at their lower ends with said horizontal flues for distributing said cooling fluid from said horizontal flues when said electrical means are deenergized.

6. In a heat treatment apparatus for high temperature heat treatment work, the combination of a heat treatment chamber, electrical means for heating said chamber, horizontally extending flues adapted to conduct a cooling fluid adjacent the base of the inner walls of said chamber, a multiplicity of vertically extending flues connected at their lower ends with said horizontally extending flues, and means for forcing a cooling fluid through each of said flues when said electrical means are deenergized.

7. In a heat treatment apparatus for high temperature heat treatment work, the combination of a heat treatment chamber, means for heating said chamber, horizontally extending flues adjacent the base of said chamber adapted to conduct a cooling fluid adjacent inner walls of said chamber, a plurality of distributing flues connected with said horizontally extending flues for establishing a multiplicity of vertically extending cooling paths adjacent the inner walls of said chamber, and automatic means for cutting off said heating means and regulating the flow of said cooling fluid through said flues for controlling the time temperature condition existent within said chamber.

8. In a heat treatment apparatus for high temperature heat treatment work, the combination of a heat treatment chamber, electrical means for heating said chamber, a horizontally extending flue in each side wall of said chamber, a multiplicity of vertically extending flues connected with said horizontally extending flues and adapted to conduct a cooling fluid adjacent inner walls of said chamber, means for deenergizing said electrical means and forcing a cooling fluid through said flues, and automatic means for controlling the time temperature condition existent within said chamber.

9. In a heat treatment apparatus, a chamber for receiving material to be subjected to heat treatment, said chamber having opposite side walls interconnected by a top portion, an outlet manifold extending longitudinally and centrally of said chamber above the top portion thereof, an independent horizontally extending inlet manifold disposed in the lower portion of each of said side walls and vertically extending flues interconnecting said horizontally extending manifold with said outlet manifold at spaced intervals along the length of said chamber, and means for regulating the passage of air through said manifolds and flues.

10. In a heat treatment apparatus, a chamber having opposite side walls interconnected by a top portion, flues disposed at intervals along the length of said heat treatment apparatus and extending vertically within said side walls and laterally across said top portion, a horizontally extending manifold disposed adjacent the base of each of said side walls and connected with each of said flues, and a discharge manifold connected with the laterally extending portions of said flues for establishing a fluid circulating path through said flues from said horizontally extending manifolds.

11. In a heat treatment apparatus, a chamber having opposite side walls interconnected by a top portion, flues disposed at intervals along the length of said heat treatment apparatus and extending vertically within said side walls and laterally across said top portion, a horizontally extending manifold disposed adjacent the base of each of said side walls and connected with each of said flues, a discharge manifold extending longitudinally and centrally of said heat treatment chamber, flues interconnecting the laterally extending flues in the top portion of said chamber with said discharge manifold and means disposed in each of said last mentioned flues for regulating the flow of circulatory fluid from said horizontally extending manifold to said discharge manifold.

In testimony whereof I affix my signature.

EDWIN L. SMALLEY.